Feb. 25, 1941.    N. A. NICHOLSON    2,232,827
FILM FIRE SCREEN FOR MOTION PICTURE APPARATUS
Filed April 18, 1939    2 Sheets-Sheet 2
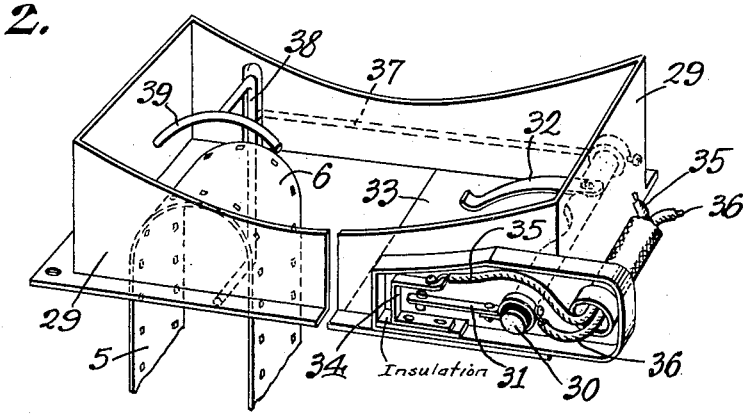
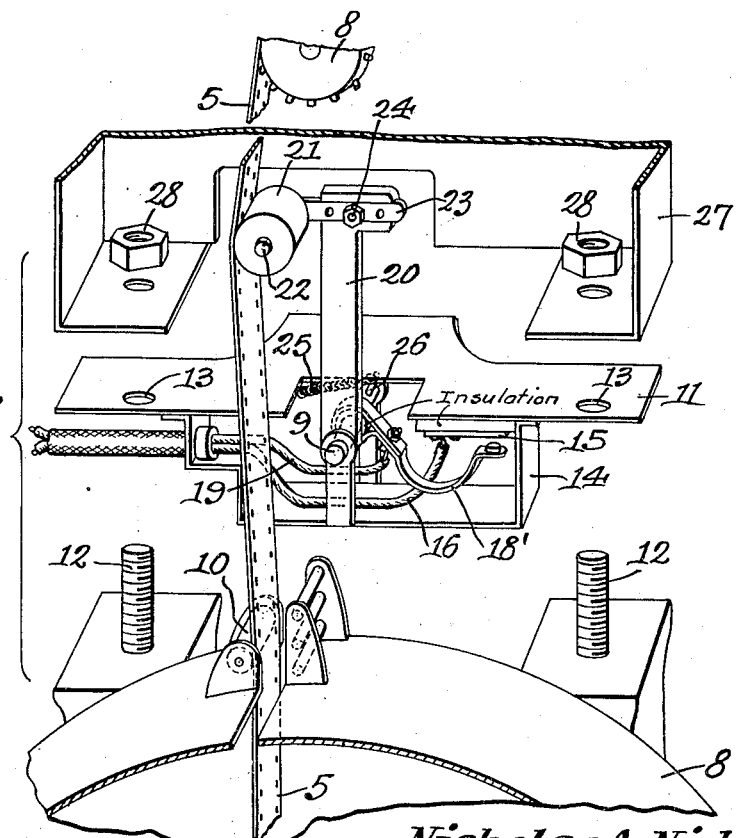
Nicholas A. Nicholson
INVENTOR.
BY
ATTORNEYS.

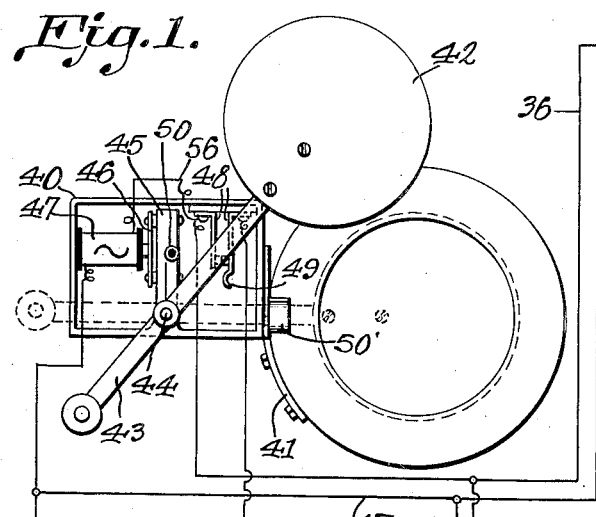
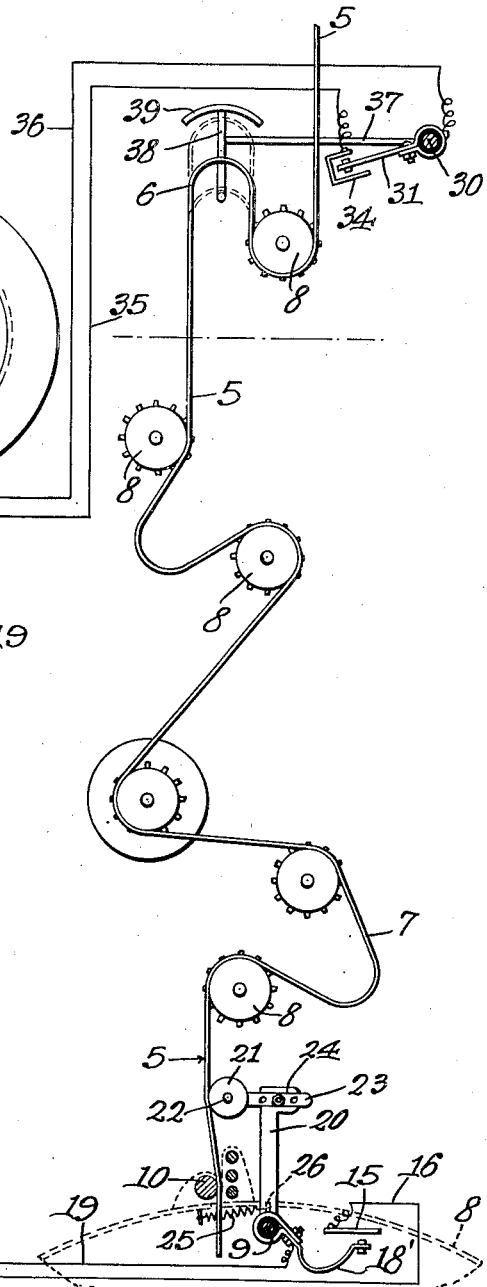
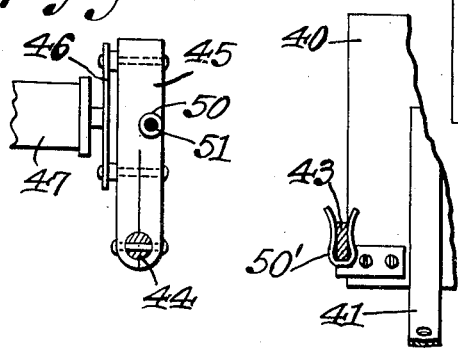

Patented Feb. 25, 1941

2,232,827

UNITED STATES PATENT OFFICE 2,232,827

FILM FIRE SCREEN FOR MOTION PICTURE APPARATUS

Nicholas A. Nicholson, Johnstown, Pa.

Application April 18, 1939, Serial No. 268,586

4 Claims. (Cl. 88—17)

This invention relates to motion picture projecting apparatus, the primary object of the invention being to provide automatically controlled means for protecting the film strip moving through the machine from the intense heat of the lamp of the apparatus, when the film strip breaks, becomes loose or when any other abnormal condition of the film strip arises.

Another object of the invention is to provide an operating means for operating the screen or douser when an abnormal condition of the film strip occurs, the operating means simultaneously moving to cut out the motor, stopping the machine.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a diagrammatic view illustrating the circuit between the douser operating means and switches, controlled by the movement of the film strip.

Figure 2 is a perspective view illustrating one of the film-strip actuated switches.

Figure 3 is a perspective view illustrating the film-strip actuated switches, which are actuated when the film strip breaks.

Figure 4 is an elevational view illustrating the means for breaking the circuit to the motor with the operation of the douser.

Figure 5 is a sectional view illustrating the means for holding the douser in its active or shielding position.

Referring to the drawings in detail, the reference character 5 designates the film or picture strip of a motion picture projecting apparatus, the upper loop of the strip being indicated at 6, while the lower loop thereof is indicated by the reference character 7.

As shown, the film strip operates over the usual feed pulleys 8, by means of which the film or picture strip is moved through the machine, before the projector lense.

The reference character 8 designates the take-up magazine, which is provided with a feed slot through which the film strip operates, as clearly shown by Figure 3 of the drawings. The film strip, which is indicated by the reference character 5 moves over the roller 10, and passes downwardly from the adaptor 11, which is bolted to the take-up magazine, by means of the bolts 12 which are positioned in the openings 13 of the adaptor. The adaptor is provided with a supporting bar 14 which depends therefrom, the supporting bar providing a support for the stationary switch member 15 to which the wire 16 is connected, the wire 16 being connected with the wire 17 that in turn is connected with the wire 18 of the main circuit.

The supporting bar 14 provides a support for the horizontal shaft 9 on which the contact arm 18' is mounted, the free end of the contact arm being disposed under the stationary contact 15, so that when the shaft is rotated in one direction, the contact arm 18' will move into engagement with the stationary contact 15, completing a circuit, in a manner to be hereinafter more fully described. Wire 19 connects with the arm 18' and constitutes the return wire of the circuit.

Extending upwardly from the shaft 9 and connected with the shaft to move therewith, is an arm 20, which arm provides a support for the roller 21 that is mounted on the shaft 22 extending laterally from the supporting arm 23. This supporting arm 23 is provided with a plurality of openings for the reception of the bolt 24 that also passes through an opening in the arm 20, so that the arm 23 may be adjusted, to adjust the roller 21. The roller 21 provides a guide for the picture strip or film, which is shown as moving thereover. The reference character 25 designates a coiled spring that is connected with the shaft 9, through the pin 26, the opposite end of the spring 25 being secured under the adaptor 11. Thus it will be seen that when the film or picture strip is moving over the roller 21, the spring 25 will be tensioned, but when the film or picture strip breaks, the roller will move laterally, under the action of the coiled spring 25, resulting in the contact arm 18' moving to complete a circuit with the stationary contact 15.

The film strip on passing to the take-up magazine, moves through the sound head 27 which is also bolted to the take-up magazine of the machine, by the bolts 12, and nuts 28.

As shown by Figure 1 of the drawings, the upper loop 6 of the film or picture strip, moves into the housing 29 supported above the sound head. The housing 29 provides a support for the shaft 30 to which the switch arm 31 is connected. A spring 32 is secured to the shaft 30, and bears against the plate 33, normally holding the switch 31 in its inactive position, between the U-shaped contact member 34, which is in circuit with a source of electricity supply, through the wire 35, the wire 36 which is connected with the switch 31, constituting the return wire of this circuit.

Secured to one end of the shaft 30, is an arm 37 that extends along one side of the housing 29, and exteriorly thereof. One wall of the housing 29 is formed with an elongated opening, through which one end of the arm 37 extends. The inner end of the arm 37 provides a support for the rod 38 that has its ends disposed inwardly in parallel spaced relation with each other. Carried by the rod 38, and secured to upper end of the rod, is a curved film-strip engaging member 39, the film being shown as moving between the member 39 and lower end of the rod 38. Thus it will be seen that due to this construction, if the film strip, which in the present showing is indicated by the reference character 5, becomes loose, the film strip will engage the curved member 39, moving the rod 38 to rotate the shaft 30 with the result that the switch member 31 is moved upwardly to engage the contact member 34, completing a circuit. Should the film strip become taut, the film strip will move into engagement with the lower end of the rod 38, moving the shaft 30 in the opposite direction, and causing the switch member 31 to move downwardly completing a circuit through the U-shaped contact member 34.

The reference character 40 designates a switch housing which is formed with a curved supporting arm 41 which is shown as bolted to the projector, adjacent to the lens thereof. The switch housing 40 also provides a support for the douser 42, which includes the douser supporting arm 43, which is pivotally mounted at 44. The shaft 44 to which the douser arm 43 is connected, also provides a support for the arm 45 that rises therefrom, the arm 45 carrying a plate 46. The reference character 47 designates a magnetic coil that cooperates with flexible plate 46 to attract the plate 46, when the coil is energized, normally holding the arm 45 and douser 42, in the positions as shown by Figure 1 of the drawings. Normally closed switch members 48 are also mounted within the switch housing 40, one of the switch members being provided with an extension 49 which is disposed in the path of travel of the roller 50, which is mounted on the pin 51, extending laterally from the arm 45. Secured to the switch housing 40, is a spring clip 50' into which the douser arm 43 moves, on moving to its active position to cut off the heat from the lamp, when the abnormal condition of the film strip occurs.

The power line is indicated by the reference character 51', and is in circuit with the wires 52 and 53 of the motion picture machine circuit, through the manually operated switch 54. The motor forming a part of the motion picture apparatus, is indicated by the reference character 55, and the circuit to the motor is made through the wires 53, 18, coil 47, wire 56, switch member 48, and wire 52. The wire 36 provides the circuit between the switch member 31 and wire 56. The wire 35 provides the circuit between the contact members 34 and wire 18 connected into the motor circuit.

Wires 16 which connect with the stationary contact plate 15, provides the circuit between the contact plate and main circuit, through the wire 17 with which the wire 16 connects. The wire 19 provides the circuit between the contact arm 18' and wire 56 of the main circuit.

The operation of the device is as follows. Assuming that the motion picture projecting machine is in operation, the douser, and various switches of the apparatus, are in the positions as shown by Figure 1 of the drawings. The electric energy is passing through the motor 55, and through the coil 47, the coil attracting the arm 45, holding the douser 42 in its inactive or elevated position. In the event that the film strip should break, it is obvious that the arm 20 will be moved laterally under the action of the coiled spring 25. The circuit is now completed through the contact arm 18', stationary contact plate 15, wires 16 and 19. Since the electric current will follow the line of least resistance, it is obvious that the electric energy will cease to flow through the coil 47, whereupon the weight of the douser will cause the douser arm to swing downwardly, the douser 42 taking a position directly in front of the projector tube of the machine. As the douser arm moves downwardly, the roller 50 will engage the extension 49 breaking the motor circuit.

In the event that slack occurs in the upper loop of the picture strip, it is obvious that the picture strip will move against the curved member 39, swinging the switch member 31 upwardly completing a circuit through the wires 35, 36, 52 and 18, deenergizing the coil 47. It is obvious that the douser will move to its active position, when the picture strip becomes taut, and is pulled downwardly to engage the U-shaped contact member 34. The circuit is now completed through the wires 35, 36, 17, 18 and 52, again causing the circuit to be shorted from the coil 47 and allowing the douser to swing downwardly from its active position.

With each movement of the douser arm to its active position, the circuit to the motor 55 is broken. Should it be desired to operate the motor to adjust the film strip or feed the film strip, while the douser is in its active position, the switch 57, which connects with the wires 13 and 52, may be operated completing the circuit to the motor, independently of the remaining wires or circuits of the apparatus.

What is claimed is:

1. A fire screen for motion picture machines, comprising a pivoted douser adapted to move to a position intercepting the light rays from the lamp of the machine, means for normally holding the douser in its inactive position, said means comprising a normally energized electromagnetic coil, an arm and plate movable with the douser, said plate being flexible, the ends of the plate being secured to the arm, the central portion of the plate being spaced from the arm, said coil adapted to attract the plate holding the douser elevated, and means controlled by the action of an abnormal film strip passing through the machine for shunting the electric circuit to the coil, whereby the douser will swing downwardly screening the light rays from the film strip passing through the machine.

2. A fire screen for motion picture machines, comprising a douser, a shaft to which the douser is secured, an arm rising from the shaft, a plate mounted on the latter arm, the central portion of said plate being spaced from the arm, a magnetic coil, a normally closed electric circuit leading to the magnetic coil, said coil adapted to attract said plate normally holding the douser in its inactive position, a motor and motor circuit, a normally closed switch in the motor circuit, an electric circuit connected with the circuit leading to the magnetic coil, a normally open switch in the latter circuit and means controlled by the action of an abnormal film strip passing through the motion picture machine for closing the latter switch and shunting the electric current passing to the magnetic coil releasing the douser simultaneously breaking the circuit to the motor, and said douser intercepting the light rays from the motion picture machine protecting the film strip passing through the machine against the heat from the lamp of the machine.

3. A fire screen for motion picture machines, comprising a switch housing, a douser including a douser arm mounted on the switch housing, an arm movable with the douser arm, a flexible plate on the second mentioned arm, a magnetic coil in the switch housing, and adapted to attract said plate, moving said douser, a motor circuit, a normally closed switch in the motor circuit, an electric circuit connected with the first mentioned electric circuit, a normally open switch in the latter circuit, means controlled by the action of the film strip passing through the machine for shunting the electric current to the magnetic coil, releasing the douser, and means for simultaneously opening the switch in the motor circuit breaking the motor circuit.

4. A fire screen for motion picture machines, comprising a switch housing, a douser including a douser arm, an arm movable with the douser arm, a flexible plate on the second mentioned arm, a magnetic coil in the switch housing, and adapted to attract said plate, moving the douser arm, a motor circuit, a normally closed switch in the motor circuit, an electric circuit connected with the first mentioned electric circuit, a normally open switch in the latter circuit, means controlled by the action of the film strip passing through the machine for shunting the electric current to the magnetic coil, releasing the douser.

NICHOLAS A. NICHOLSON.